(12) United States Patent
Lin et al.

(10) Patent No.: US 7,554,273 B2
(45) Date of Patent: *Jun. 30, 2009

(54) PROTECTION FOR EXTERNAL ELECTRODE FLUORESCENT LAMP SYSTEM

(75) Inventors: Yung-Lin Lin, Palo Alto, CA (US); Da Liu, Milpitas, CA (US)

(73) Assignee: O2Micro International Limited, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 11/879,991

(22) Filed: Jul. 18, 2007

(65) Prior Publication Data

US 2008/0054826 A1  Mar. 6, 2008

Related U.S. Application Data

(63) Continuation of application No. 11/516,474, filed on Sep. 5, 2006, now Pat. No. 7,248,240.

(51) Int. Cl.
*G05F 1/00* (2006.01)

(52) U.S. Cl. .................. 315/307; 315/291; 315/224; 315/312; 315/209 R; 315/DIG. 7

(58) Field of Classification Search ............ 315/209 R, 315/219, 220, 224, 225, 276, 277, 291, 307, 315/308, 212, 312, DIG. 2, DIG. 5, DIG. 7
See application file for complete search history.

(56) References Cited

U.S. PATENT DOCUMENTS

| 6,259,615 | B1 * | 7/2001 | Lin ........................ 363/98 |
|---|---|---|---|
| 6,570,344 | B2 | 5/2003 | Lin |
| 6,922,023 | B2 * | 7/2005 | Hsu et al. .................... 315/291 |
| 6,930,898 | B2 | 8/2005 | Jeon et al. |
| 7,119,495 | B2 * | 10/2006 | Jang ........................... 315/244 |
| 7,126,289 | B2 * | 10/2006 | Lin et al. .................... 315/308 |
| 7,141,935 | B2 * | 11/2006 | Ushijima et al. ......... 315/209 T |
| 7,148,633 | B2 * | 12/2006 | Yu et al. ..................... 315/224 |
| 7,253,569 | B2 * | 8/2007 | Liu ............................. 315/291 |
| 7,265,497 | B2 * | 9/2007 | Chen et al. .............. 315/209 R |
| 7,288,903 | B2 * | 10/2007 | Jang et al. .................... 315/307 |
| 7,327,100 | B2 * | 2/2008 | Matsuura .................... 315/307 |
| 7,332,867 | B2 * | 2/2008 | Cho ....................... 315/209 R |
| 7,417,382 | B2 * | 8/2008 | Lin ............................. 315/225 |
| 2004/0056830 | A1 | 3/2004 | Lee et al. |
| 2004/0183465 | A1 | 9/2004 | Jang |
| 2005/0078080 | A1 * | 4/2005 | Kang et al. ................. 345/102 |
| 2005/0116662 | A1 | 6/2005 | Sanchez |
| 2005/0174818 | A1 * | 8/2005 | Lin et al. ...................... 363/98 |

FOREIGN PATENT DOCUMENTS

KR     1020040018658 A     3/2004

* cited by examiner

*Primary Examiner*—Haissa Philogene

(57) ABSTRACT

The present invention provides a driving circuit with protection function for driving a set of external electrode fluorescent lamps (EEFL). The drive circuit includes: a transformer connected to the set of EEFLs; a switching network connected to the transformer which delivers power to the transformer; a sensing circuit connected to the set of EEFLs which detects disconnection if one light source is disconnected; and a controller connected to the switching network which controls the switching network to reduce the total current supplied to the EEFLs which remain connected, if the sensing circuit detects that one EEFL is disconnected. Appropriate protection can therefore be implemented when the EEFL is disconnected on one end or both ends.

35 Claims, 10 Drawing Sheets

PROTECTION FOR EXTERNAL ELECTRODE FLUORESCENT LAMP SYSTEM

CROSS REFERENCE TO PRIOR U.S. APPLICATION

This application is a continuation of U.S. patent application Ser. No. 11/516,474, filed on Sep. 5, 2006, entitled "PROTECTION FOR EXTERNAL ELECTRODE FLUORESCENT LAMP SYSTEM," which is now U.S. Pat. No. 7,248,240 B2, which claims priority to the copending utility patent application Ser. No. 10/923,188, filed on Aug. 20, 2004, entitled "PROTECTION FOR EXTERNAL ELECTRODE FLUORESCENT LAMP SYSTEM." which is now U.S. Pat. No. 7,126,289 B2, and the contents of these applications are expressly incorporated herein by reference.

FIELD OF THE INVENTION

The present invention relates to a protection means, and more specifically, to a protection means for a driving circuit which drives a plurality of external electrode fluorescent lamps.

BACKGROUND OF THE INVENTION

Large-size LCD panels usually use cold cathode fluorescent lamp (CCFL) as conventional backlight source. Each CCFL has two electrode terminals where hard-ware wires are connected to a power source, usually a DC/AC inverter. Due to the increased panel size and number of lamps used in large LCD panel applications, the wiring becomes a complex burden both in manufacturing and cost.

External electrode fluorescent lamp (EEFL), on the other hand, has both electrodes exposed at both ends of the lamp, does not require any hard-ware wiring. Such that EEFL is used in in large LCD panel applications. Multiple EEFLs are placed in parallel on the back of the LCD panel. There are two metal plates for electrical connections. One plate connects to one end of all the EEFLs and the other plate connects to the other end of all the EEFLs. The power source, generally a DC/AC inverter, simply provides power to both metal plates for operating the EEFLs.

FIG. 1 is a conventional EEFL driving circuit 10 plus its current sensing circuit 260 in accordance with the prior art. As shown in FIG. 1, a conventional driving means plus its current sensing circuit 260 is illustrated. Generally, the driving circuit 10 includes transformer 220 and 222, which are configured with 180 degree off phase to each other. Thus the quasi-sinusoidal waveforms generated by transformer 220 and 222 are of 180 degree phase difference. Since all the EEFLs 40 are connected in parallel by its nature, the regulation of the EEFL current is implemented by sensing and controlling the sum of the current flowing through each EEFL (EEFL(1), EEFL(2) ... EEFL(n)). The sensing circuit 260 includes two sensing resistor 17 and 18. As known by those skilled in art, sensing circuit 260 can sensing the total current by sensing the voltages on the sensing resistor 17 and 18. One drawback occurs when one of the EEFLs 40 is not connected properly. The rest of the EEFLs will be overdriven since the controller controls the total current only. For example, if one of the EEFLs, EEFL(n) gets open, then EEFL(1) to EEFL(n−1) will be overdriven by excess current flowing through. This will degrade the life time of the EEFL.

SUMMARY OF THE INVENTION

A driving circuit with protection function for driving a set of cold cathode fluorescent lamps in accordance with the present invention includes: a transformer connected to the set of cold cathode fluorescent lamps; a switching network connected to the transformer which delivers power to the transformer; a sensing circuit connected to the set of cold cathode fluorescent lamps which detects disconnection if one cold cathode fluorescent lamp is disconnected; and a controller connected to the switching network which controls the switching network to reduce the total current supplied to the cold cathode fluorescent lamps which remain connected, if the sensing circuit detects that one cold cathode fluorescent lamp is disconnected.

BRIEF DESCRIPTION OF THE DRAWINGS

The foregoing aspects and many of the attendant advantages of this invention will become more readily appreciated and better understood by referencing the following detailed description, when taken in conjunction with the accompanying drawings, wherein.

DESCRIPTION OF THE EMBODIMENTS

Figure 1:
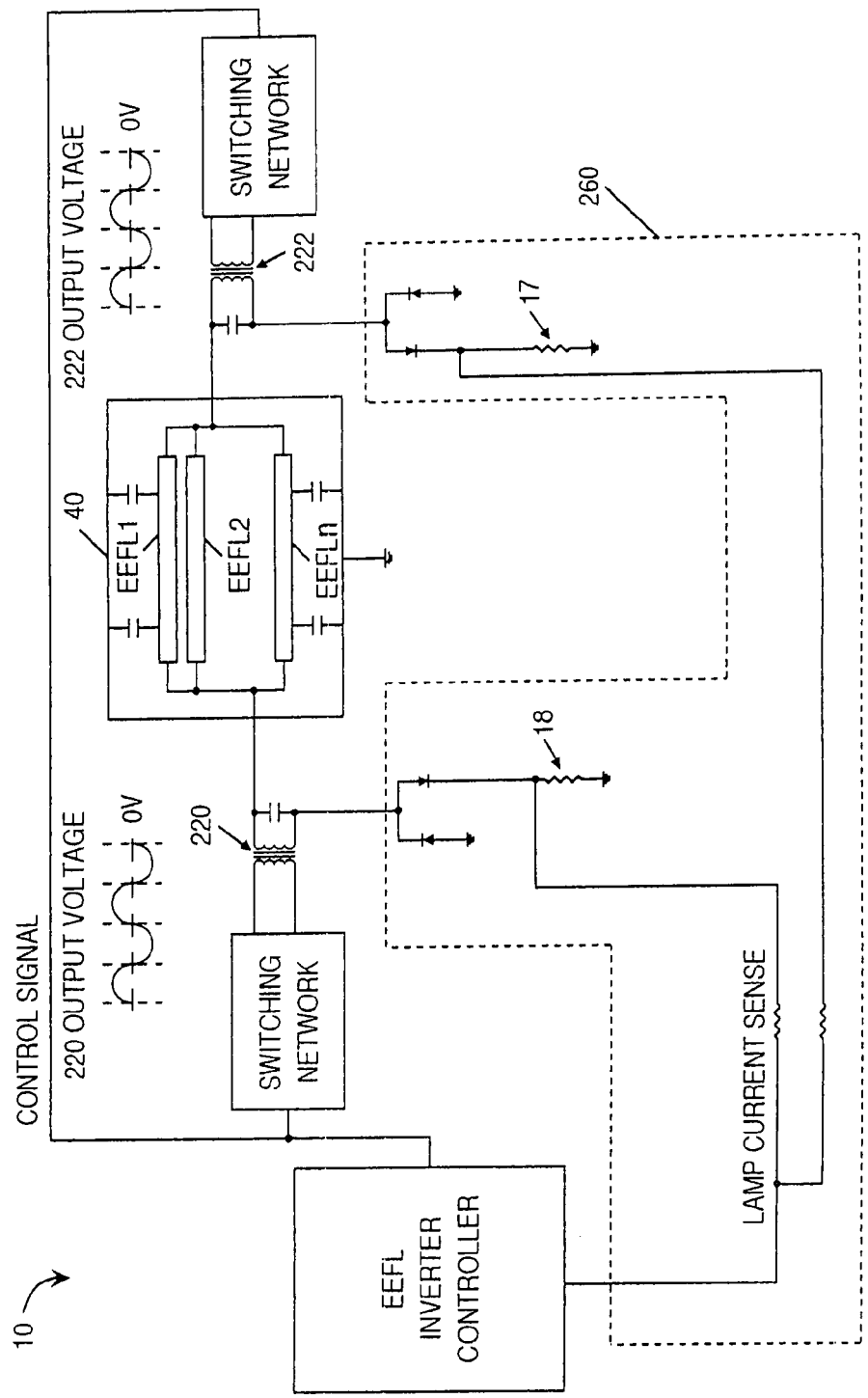
FIG. 1 is a conventional driving circuit plus its current sensing circuit in accordance with the prior art.
Figure 2:
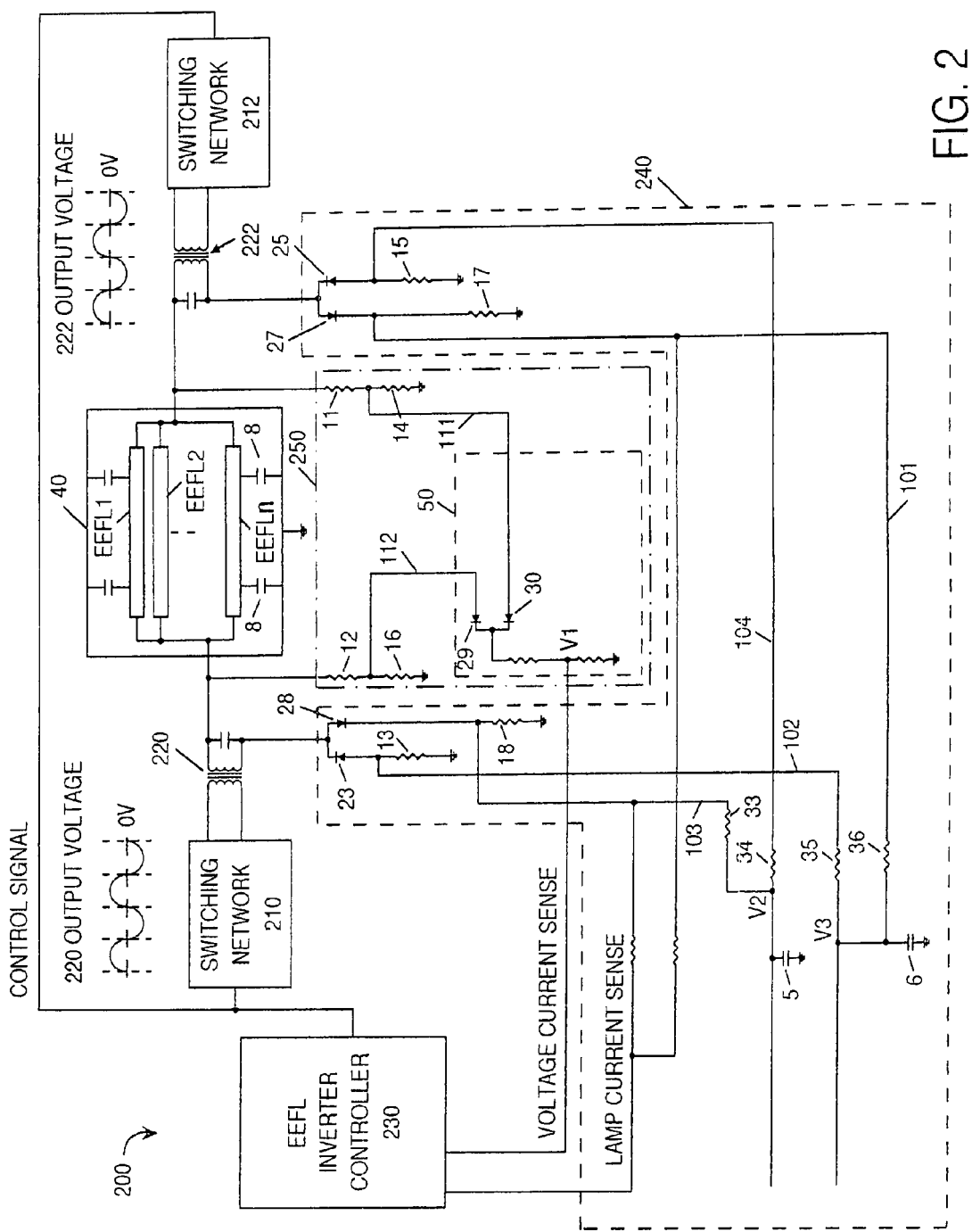
FIG. 2 is a circuit diagram of a driving circuit with protection function in accordance with the present invention.

Turning to FIG. 2, a circuit diagram of a driving system 10' with protection function in accordance with the present invention is depicted. Generally, system 10' includes a plurality of EEFLs 40 (EEFL(1), EEFL(2) . . . , EEFL(n)); transformer 220 and 222; switching network 210 and 212; EEFL inverter controller 230; first end sensing circuit 240 and second end sensing circuit 250.

Transformer 220 and 222 which delivery power to EEFLs 40 (EEFL(1), EEFL(2) . . . , EEFL(n)) are connected to the two plates of the EEFLs 40 respectively. As shown in FIG. 2, switching network 210 is connected to transformer 220. Similarly, switching network 212 is connected to transformer 222. Switching network 210 and 212 can include a DC/AC converter, such as the push-pull, half-bridge, full-bridge type DC/AC converter. EEFL inverter controller 230 sends control signals to both switching networks 210 and 212, thus regulate the current supplied to the EEFLs. Purposely, transformer 220 and 222 are configured with 180 degree off phase to each other. Each secondary side of the transformers 220 and 222 generates a quasi-sinusoidal waveform to the EEFLs. Therefore the quasi-sinusoidal waveforms generated by transformer 220 and 222 are of 180 degree phase difference. First end sensing circuit 240 mainly includes a first current sensing circuit 101, a second current sensing circuit 102, a third current sensing circuit 103 and a forth current sensing circuit 104. The first current sensing circuit 101 includes diode 27 and sensing resistor 17; the second sensing circuit 102 includes diode 23 and sensing resistor 13; the third sensing circuit 103 includes diode 28 and sensing resistor 18; the forth sensing circuit 104 includes diode 25 and sensing resistor 15. Current sense means is implemented with both positive and negative half cycles. During normal operation, take a positive half for example, current flows from top side of transformer 220 into "left plate" of the EEFLs 40, through EEFLs to the "right plate", then into the top of transformer 222, flowing out of the bottom of transformer 222 into the first current sensing circuit 101 (diode 27 and sensing resistor 17) to ground and into the second current sensing circuit 102 (sensing resistor 13, diode 23), then flows into the bottom of transformer 220. The diode 27 and 23 direct the current supplied to the EEFLs flowing to transformer 220. This forms a complete current loop for the positive half cycle. Sensing resistor 17 therefore senses a positive half-wave quasi-sinusoidal current while sensing resistor 13 senses a negative half-wave current. In another word, the first current sensing circuit 101 senses a positive current and the second current sensing circuit 102 senses a negative current. Such that the first voltage on sensing resistor 13 indicates the current through a first end (left plate) of the plurality of EEFLs 40 and the second voltage on sensing resistor 17 indicates the current through a second end (right plate) of the plurality of EEFLs 40. However, the present invention will not be limited by only sensing the positive or negative current. It can be modified to sense the current during half of a current cycle. Assume that the resistance of sensing resistor 17 is equal to that of sensing resistor 13, by summing the sensed voltages of sensing resistor 13 and sensing resistor 17 through resistor 35, 36 and capacitor 6, the sensed voltage at node V3 is approximately 0 volt during normal operation, that is, no EEFL is disconnected. Similarly, in the next half cycle, the current flows from the top of transformer 222 into the "right plate" of the EEFLs 40, through EEFLs to the "left plate", then into the top of transformer 220, flows out of the bottom of transformer 220 into the third current sensing circuit 103 (diode 28 and sensing resistor 18) to ground and into the forth current sensing circuit 104 (sensing resistor 15, diode 25), then into the bottom of transformer 222. The diode 28 and 25 direct the current supplied to the EEFLs flowing to transformer 222. This forms a complete current loop for the negative half cycle. Sensing resistor 18 therefore senses a positive half-wave quasi-sinusoidal current while sensing resistor 15 senses a negative half-wave current. In another word, the third current sensing circuit 103 senses a positive current and the forth current sensing circuit 104 senses a negative current. Such that the first voltage on sensing resistor 18 indicates the current through a first end (left plate) of the plurality of EEFLs 40 and the second voltage on sensing resistor 15 indicates the current through a second end (right plate) of the plurality of EEFLs 40. However, the present invention will not be limited by only sensing the positive or negative current. Rather, it can be modified to sense the current during any half of a current cycle. Likewise, assume that the resistance of sensing resistor 18 is equal to that of sensing resistor 15, by summing the sensed voltages of sensing resistor 15 and sensing resistor 18 through resistor 33, 34 and capacitor 5, the sensed voltage at node V2 is approximately 0 volt during normal operation, that is, no EEFL is disconnected.

Sensed current signals for both half cycles are sent to the EEFL inverter controller 230. Based on the state of the sensed current signals which indicate whether the EEFL is disconnected on one end or not, controller 230 will generate corresponding control signals to switch network 210 and 212 in order to regulate the current supplied to the EEFLs 40. For example, if the sensing signals indicate that the EEFL is disconnected on one end, the control signals will control the switching network 210 and 212 to reduce the total current supplied to the EEFLs which remain connected. The overdriven event is thus avoided.

In addition, the voltage sense for the secondary windings of transformer 220 and 222 is implemented through second end sensing circuit 250. Second end sensing circuit 250 generally includes a first voltage sensing circuit 111 and a second voltage sensing circuit 112. The first voltage sensing circuit 111 includes resistor 11, 14 and diode 30; the second voltage sensing circuit 112 includes resistor 12, 16 and diode 29. Second end sensing circuit 250 senses the voltage across the EEFLs 40. The operation of second end sensing circuit 250 will be described below in detail in FIG. 5. Similarly, the sensed voltage signals are sent to the EEFL inverter controller 230. Based on the state of the sensed voltage signals which indicate whether the EEFL are disconnected on both ends or not, controller 230 will generate corresponding control signals to both switching network 210 and 212 to regulate the voltage across the EEFLs. For example, if the sensing signals indicate that both ends of one EEFL are open, the control signals will control the switching network 210 and 212 to reduce the total current across the EEFLs which remain connected. The overdriven event thus can be prevented.

Figure 3:
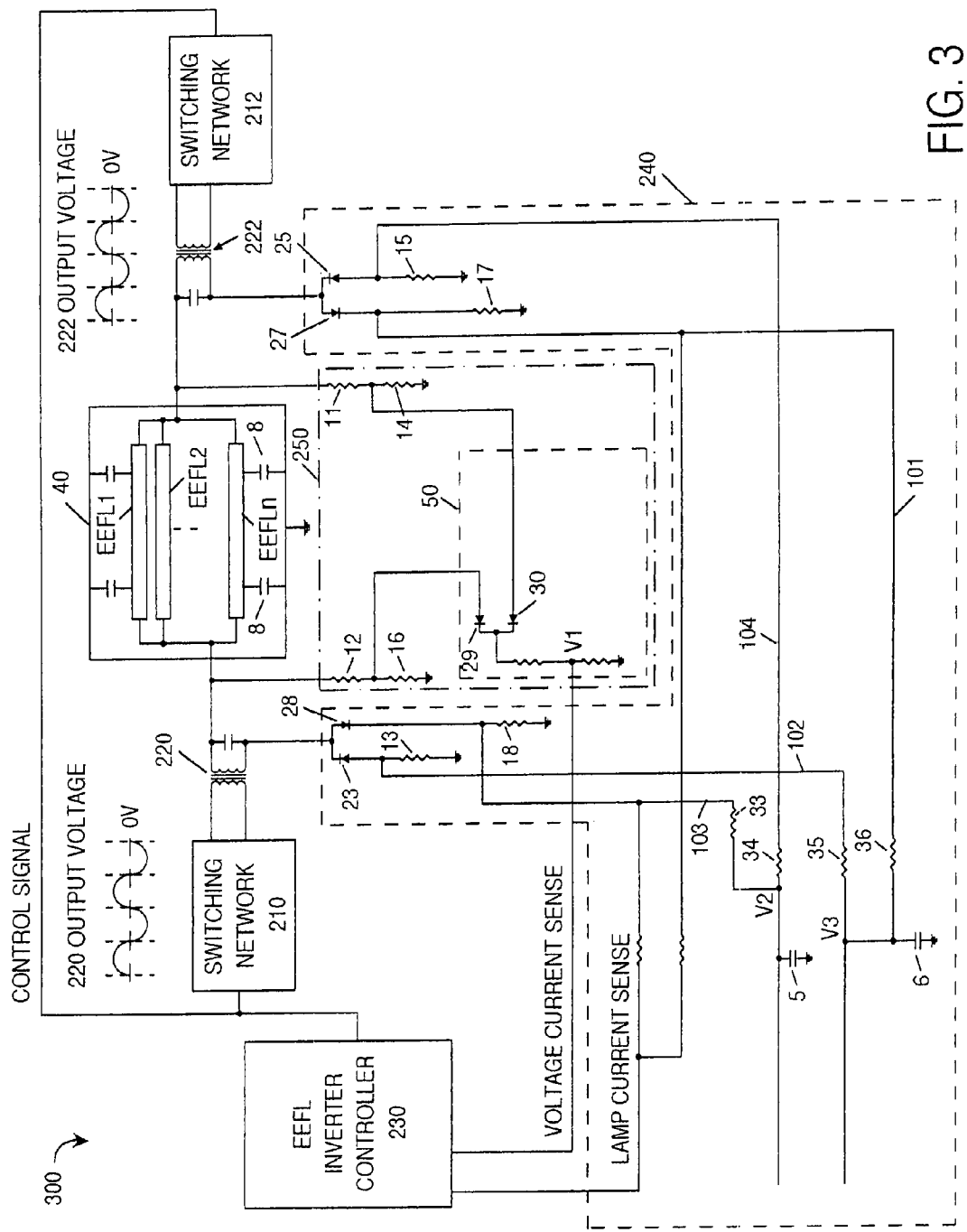
FIG. 3 is a circuit diagram of a driving circuit with protection function when the EEFL is disconnected on one end.

FIG. 3 is a circuit diagram of a driving circuit 10" with protection function when the EEFL is disconnected on one end. Many elements of FIG. 3 are similar to those of the FIG. 2, as such, are labeled similarly. Hence any repetitive description of similar elements that was already detailed with respect to FIG. 2 is omitted herein for clarity, and rather the differences between FIG. 2 and FIG. 3 are detailed herein. As shown in FIG. 3, the "right end" of EEFL(n) is disconnected from transformer 222, i.e., open. Such that the current flowing in the positive half cycle from top of transformer 220 into "left plate" of the EEFLs 40 will flow through EEFL(1), EEFL(2) . . . EEFL(n−1) to transformer 222, and flow through EEFL(n) body to chassis (ground). Therefore all EEFLs are lit. EEFL(n) is lit by the leakage current flowing through capacitor 8 to ground. In general, the leakage current flows from the top of transformer 220 into the "left plate" of EEFL (n), then through the parasitic capacitor 8 of EEFL(n) to chassis ground, second current sensing circuit 102 (sensing resistor 13, diode 23) and back into the bottom of transformer 220. The diode 23 directs the current supplied to the EEFLs flowing to transformer 220. Therefore, this portion of the current is not detected via the first current sensing circuit 101 (sensing resistor 17) which only senses the amount of the current flowing through EEFL(1), EEFL(2) . . . and EEFL(n−1). The current flowing through sensing resistor 13 of second current sensing circuit 102 is equal to the total current of the current flowing through sensing resistor 17 of first current sensing circuit 101 plus the leakage current. As described with respect to FIG. 2, sensing resistor 17 senses a positive half-wave quasi-sinusoidal current while sensing resistor 13 senses a negative half-wave current. That is, the first current sensing circuit 101 senses a positive current and the second current sensing circuit 102 senses a negative current. Assume that the resistance of sensing resistor 17 is equal to that of sensing resistor 13, by summing the sensed voltage across sensing resistor 13 and sensing resistor 17 through resistor 35, 36 and capacitor 6, the sensed voltage at node V3 will be lower than 0 volt. That's because the positive current flowing through sensing resistor 17 of first current sensing circuit 101 is less than the negative current flowing through sensing resistor 13 of second current sensing circuit 102. Therefore, the sensed voltage at node V3 is lower than 0 Volt while the sensed voltage at node V2 is greater than 0 Volt compared to the normal operating condition, if the right end of one of the EEFLs is disconnected. In a word, the absolute value of the voltage at node V3 and V2 will exceed a predetermined level which is 0 Volt during the normal operation if the right end of an EEFLs is disconnected.

Similarly, if the "left end" of EEFL(n) is disconnected from transformer 220, the current flowing in the negative half cycle from top of transformer 222 into "right plate" of the EEFLs will flow through EEFL(1), EEFL(2) . . . EEFL(n-1) to transformer 220, and flow through and EEFL(n) body to chassis (ground). All EEFLs are lit. EEFL(n) is lit by the leakage current flowing through capacitor 8 to ground. The leakage current flows from the top of transformer 222 into the "right plate" of EEFL(n), then through the parasitic capacitor 8 of EEFL(n) to chassis ground, forth current sensing circuit 104 (sensing resistor 15, diode 25) and the bottom of transformer 222. The diode 25 directs the current supplied to the EEFLs flowing to transformer 222. This portion of the current is not detected via the third current sensing circuit 103 (sensing resistor 18) which only senses the amount of the current flowing through EEFL(1), EEFL(2) . . . and EEFL(n-1). The current flowing through sensing resistor 15 of forth current sensing circuit 104 is equal to the total current of the current flowing through sensing resistor 18 of third current sensing circuit 103 plus the leakage current. Likewise, the sensed voltage at node V2 will be lower than 0 Volt while the sensed voltage at node V3 is greater than 0 Volt compared to the normal operating condition, if the left end of an EEFLs is disconnected. That is, the absolute value of the voltage at node V3 and V2 will exceed a predetermined level which is 0 Volt during the normal operation if the left end of one of the EEFLs is disconnected.

Therefore, the first end sensing circuit 240 can detect the disconnection by summing the voltage at node V2 and V3, if one end of an EEFL is disconnected from the transformer. If the absolute value of the voltage at node V3 and V2 exceeds a predetermined level which is 0 Volt during the normal operation, first end sensing circuit 240 will detect that the EEFL is disconnected on one end.

Discussed above is the situation when only one EEFL gets disconnected. But the present invention will not be limited by such situation when only one EEFL gets disconnected and will be applicable to multiple EEFLs disconnections. When one or more right ends of EEFLs get disconnected, the sensed voltage at V2 will be greater than 0 Volt while V3 is lower than 0 Volt. When one or more left ends of EEFLs get disconnected, the sensed voltage at V3 will be greater than 0 Volt while V2 is lower than 0 Volt.

By measuring the voltage at node V2 and V3, first end sensing circuit 240 will generate corresponding sensing signals to EEFL inverter controller 230 based on the sensed voltage at node V2 and V3. EEFL inverter controller 230 in turn provides appropriate control signals to both switching network 210 and 212 based on those sensing signals. The control signals are used for controlling the switching network 210 and 212 to regulate the current supplied to the EEFLs to avoid the over-current condition. For example, if the sensing signals indicate that an EEFL is open on one end, the control signals will control the switching network 210 and 212 to reduce the total current supplied to the EEFLs which remain connected. Appropriate protection therefore can be implemented by sensing V2 and V3 to the EEFL inverter controller 230 when the EEFL is disconnected on either end.

Figure 4:
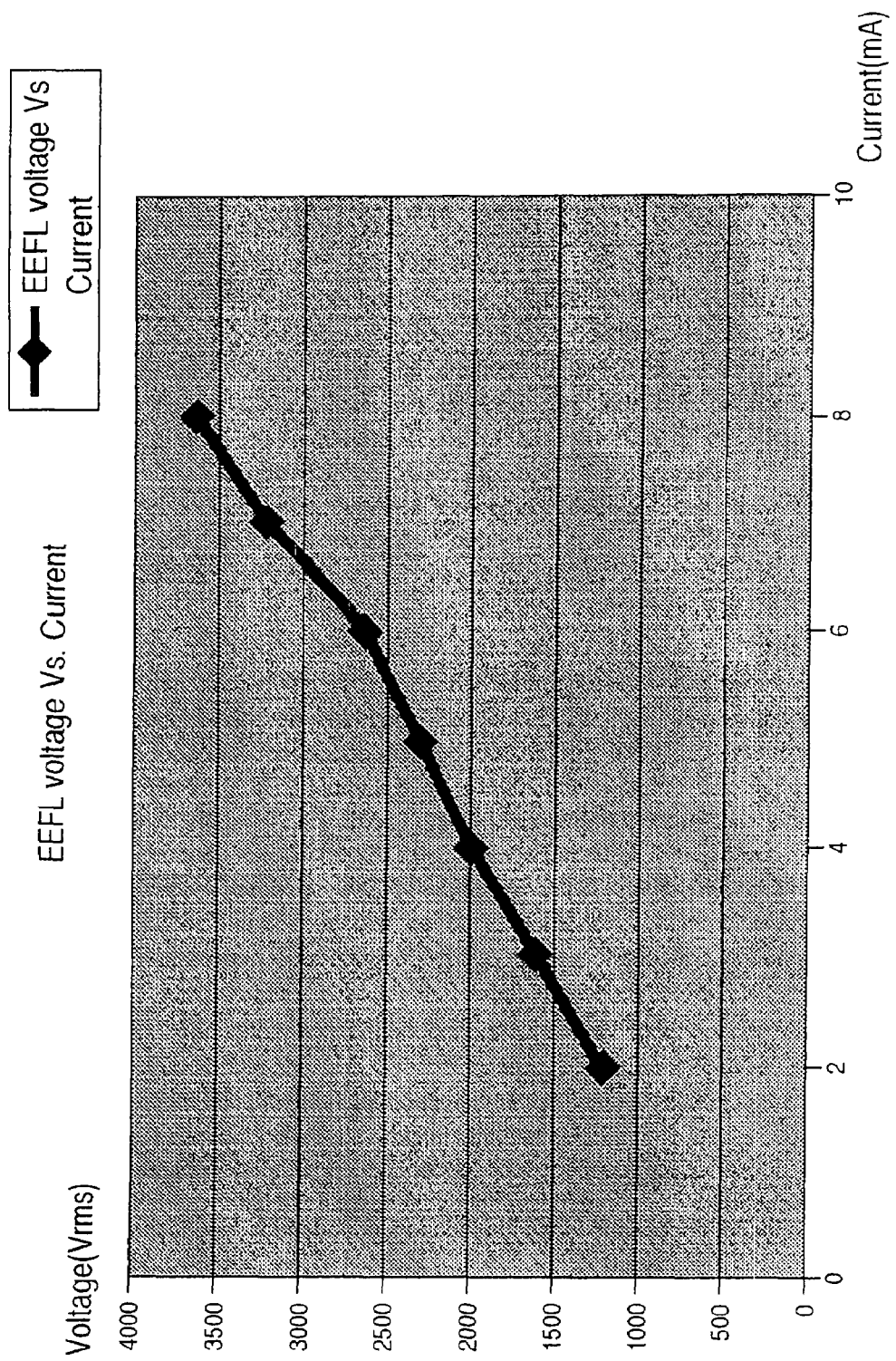
FIG. 4 shows the voltage-current characteristic of the EEFL.

Turning to FIG. 4, the voltage-current characteristic of the EEFL is depicted. The voltage-current characteristics in FIG. 4 shows that the voltage and current of the EEFL are approximately in linear relationship. That is, the higher the current flowing through EEFL is, the higher the voltage across the EEFL will be. Advantageously, the invention circuit takes the advantage of the characteristics to provide proper protection functions as will be detailed below.

Figure 5:
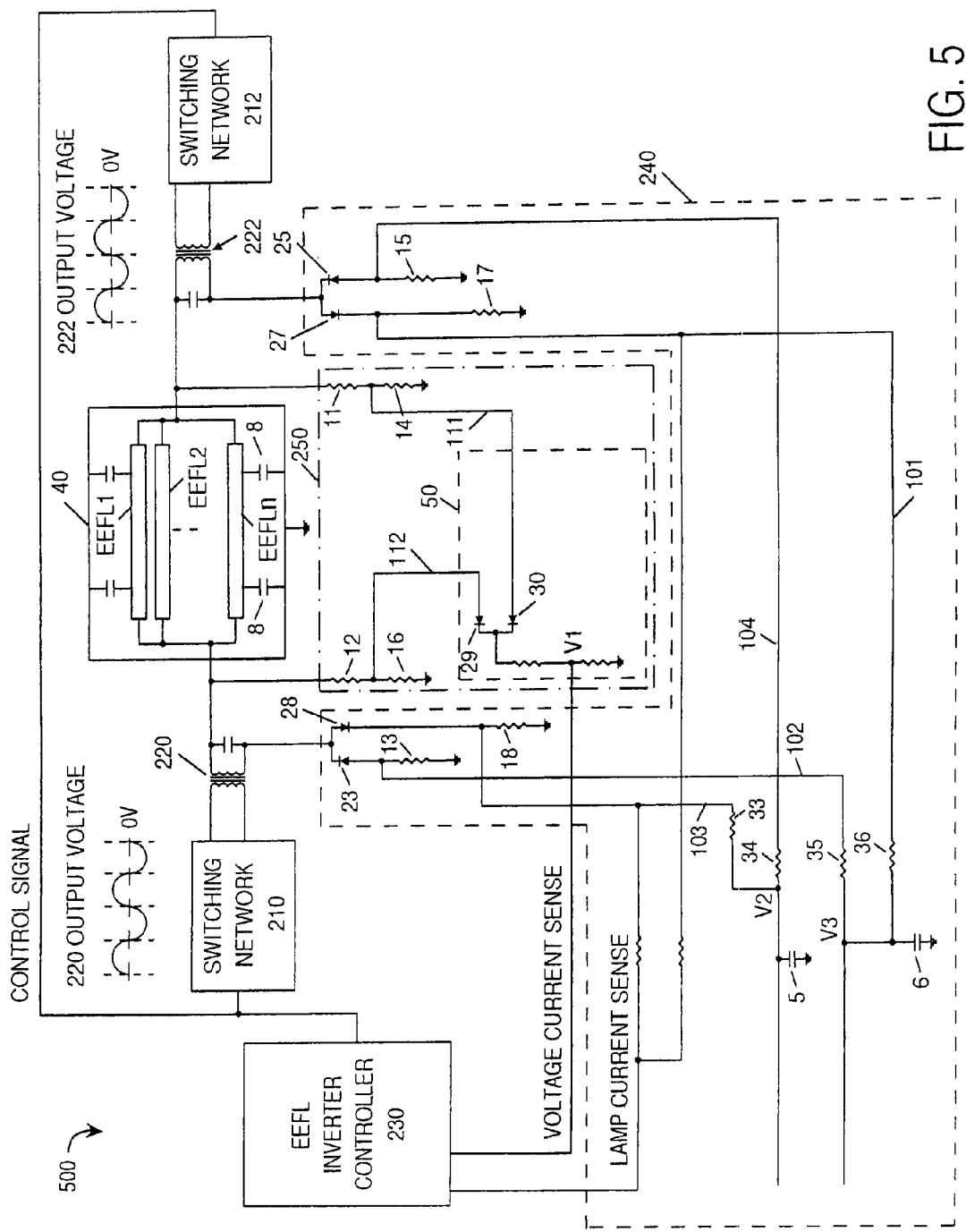
FIG. 5 is a circuit diagram of a driving circuit with protection function when the EEFL is disconnected on both ends.

FIG. 5 is a circuit diagram 10''' of a driving circuit with protection function when the EEFL is disconnected on both ends. Many elements of FIG. 5 are similar to those of the FIG. 2 and FIG. 3, as such, are labeled similarly. Hence any repetitive description of similar elements that was already detailed with respect to FIG. 2 and FIG. 3 is omitted herein for clarity, and rather the differences between FIG. 5 and FIG. 2, 3 are detailed herein. As shown in FIG. 5, both "right end" and "left end" of EEFL(n) are disconnected from transformer 222 and transformer 220. The current will flow only through EEFL(1), EEFL(2) . . . EEFL(n-1), since EEFL(n) is not conducted. The total current will be supplied to EEFL(1), EEFL(2) . . . EEFL(n-1), except EEFL(n). Since the total current is fixed and EEFL(n) is not conducted, EEFL(1), EEFL(2). EEFL(n-1) will be overdriven. However, the second end sensing circuit 250 will have higher sensed voltage when one of the EEFLs, e.g. EEFL(n) is not conducted since all other EEFLs (EEFL (1), EEFL(2) . . . EEFL(n-1)) are driven with higher current. Second end sensing circuit 250 generally includes a first voltage sensing circuit 111 and a second voltage sensing circuit 112 and a resistor divider 50 which comprises resistor 29, 30. The first voltage sensing circuit 111 includes resistor 11, 14 and diode 30; the second voltage sensing circuit 112 includes resistor 12, 16 and diode 29. Second end sensing circuit 250 senses the voltage across the EEFLs 40. Resistor divider 50 is used to minimize the effect of voltage variation to voltage sense. As shown in the FIG. 5, the first voltage sensing circuit 111 senses the voltage during one half of the voltage cycle while the second voltage sensing circuit 112 senses voltage during the other half of the voltage cycle. The voltage sensed by the second end sensing circuit 250 at node V1 is proportional to the voltage across the EEFLs 40. By differentiating the voltage at node V1 under normal operation and abnormal operation conditions, EEFL inverter controller 230 can provide an appropriate protection to the inverter circuit. For example, if one of the EEFLs is not conducted, the sensed voltage at node V1 will be higher than the normal operation. In normal operation, when no EEFL is disconnected, the sensed voltage at node V1 is set as a predetermined level. Once the sensed voltage at node V1 is detected that exceeds a predetermined level which is under normal operation, a disconnection will be detected. And the sensed signals will be sent to controller 230, which in turn generates the corresponding control signals to control the switching network 210 and 212, thus provide appropriate protection to the inverter circuit. For example, if the sensing signals indicate that one EEFL is disconnected on both ends, the control signals will control the switching network 210 and 212 to reduce the total current applied to the EEFLs 40, such that the overdriven protection is provided.

Figure 6:
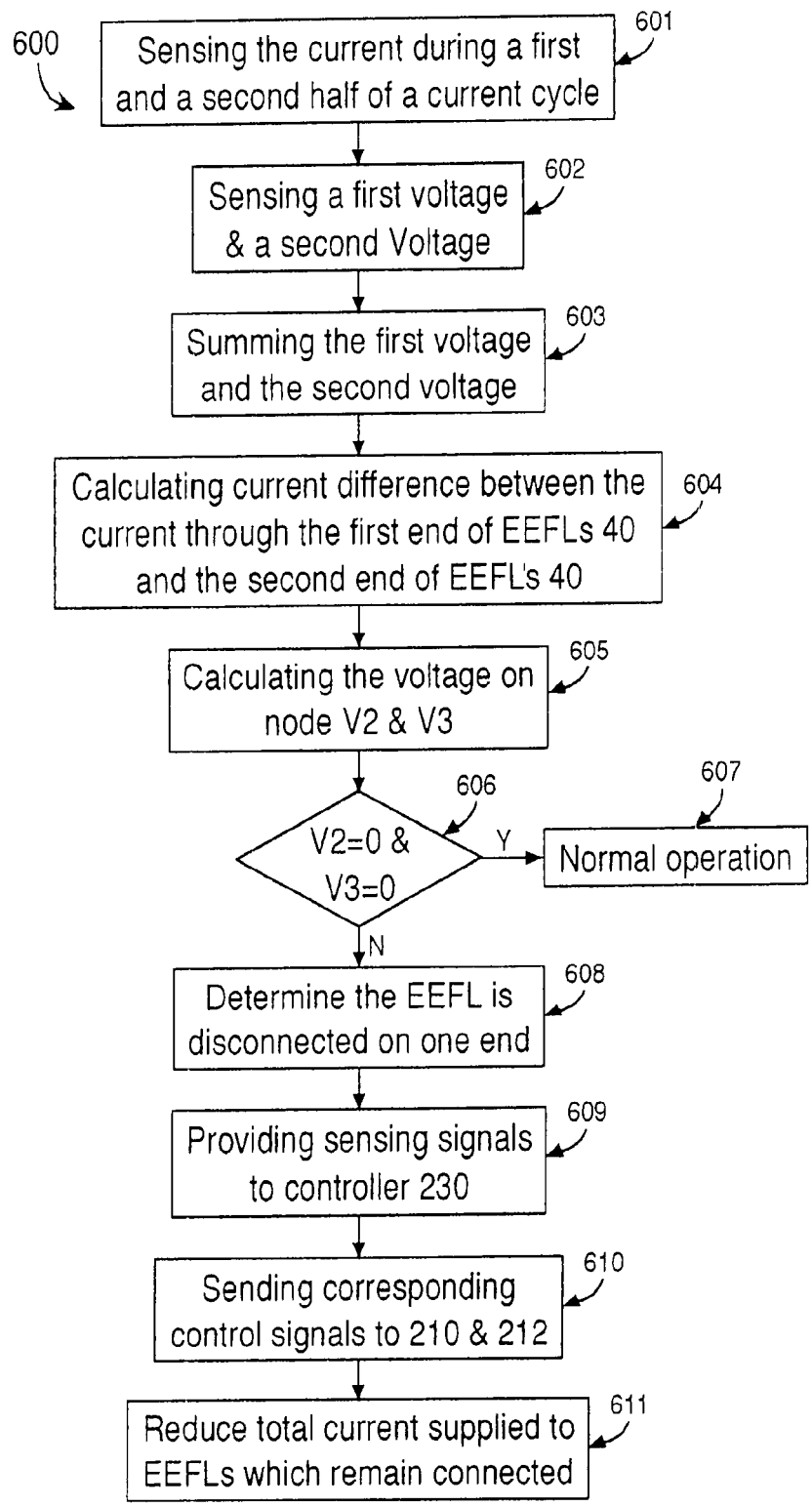
FIG. 6 is a flowing chart of a protection method provided by one end sensing circuit in accordance with the present invention when the EEFL is disconnected on one end.

FIG. 6 shows a flowing chart 600 of protection method provided by the first end sensing circuit 240 in accordance with the present invention. Generally, first end sensing circuit 240 detects and provides protection function to a driving circuit if the EEFL is disconnected on one end. As shown in step 602 of FIG. 6, first end sensing circuit 240 senses a first voltage across the first sensing resistor and a second voltage across the second sensing resistor by sensing the current during a first half of a current cycle and a second half of a current cycle in step 601. Take FIG. 2 for reference, the first voltage is the voltage across sensing resistor 13 which indicates the current through a first end (left plate) of the plurality of EEFLs 40 and the second voltage is the voltage across sensing resistor 17 which indicates the current through a second end (right plate) of the plurality of EEFLs 40. In FIG. 2, during normal operation, take a positive half for example, current flows from top side of transformer 220 into "left plate" of the EEFLs 40, through EEFLs to the "right plate", then into the top of transformer 222, flowing out of the bottom of transformer 222 into the first current sensing circuit 101 (diode 27 and sensing resistor 17) to ground and into the second current sensing circuit 102 (sensing resistor 13, diode 23), then flows into the bottom of transformer 220. The diode 27 and 23 direct the current supplied to the EEFLs flowing to transformer 220. This forms a complete current loop for the positive half cycle. Sensing resistor 17 therefore senses a positive half-wave quasi-sinusoidal current while sensing resistor 13 senses a negative half-wave current. In another word, the first current sensing circuit 101 senses a positive current and the second current sensing circuit 102 senses a negative current. Such that the first voltage on sensing resistor 13 indicates the current through a first end (left plate) of the plurality of EEFLs 40 and the second voltage on sensing resistor 17 indicates the current through a second end (right plate) of the plurality of EEFLs 40. Thus the current difference between the first end (left plate) of EEFLs 40 and the second end (right plate) of EEFLs 40 will be calculated in step 604 of FIG. 6. Therefore, still in FIG. 6, first end sensing circuit 240 sums the voltage on node V2 and V3 respectively in step 605, that is, to sum the sensed first voltage on sensing resistor 13/18 and the second voltage on sensing resistor 17/15. The sum of the first voltage on sensing resistor 13/18 and the second voltage on sensing resistor 17/15 indicates the current difference between the current through the left plate and right plate of EEFLs 40. Back to FIG. 2, assume that the resistance of sensing resistor 17 is equal to that of sensing resistor 13, by summing the sensed voltages of sensing resistor 13 and sensing resistor 17 through resistor 35, 36 and capacitor 6, the sensed voltage at node V3 is approximately 0 volt during normal operation, that is, no EEFL is disconnected. So in step 606 of FIG. 6, if V2=0 and V3=0, then first end sensing circuit 240 will determine that the driving circuit is under normal operation, i.e., no one end of EEFL is disconnected (step 607). If not, e.g., V2>0 and V3<0 or V2<0 and V3>0, then first end sensing circuit 240 will determine that the EEFL is disconnected on one end. (in step 608). Take FIG. 3 for reference, the "right end" of EEFL(n) is disconnected from transformer 222, i.e., open. Such that the current flowing in the positive half cycle from top of transformer 220 into "left plate" of the EEFLs 40 will flow through EEFL(1), EEFL(2)...EEFL(n−1) to transformer 222, and flow through EEFL(n) body to chassis (ground). Therefore all EEFLs are lit. EEFL(n) is lit by the leakage current flowing through capacitor 8 to ground. In general, the leakage current flows from the top of transformer 220 into the "left plate" of EEFL (n), then through the parasitic capacitor 8 of EEFL(n) to chassis ground, second current sensing circuit 102 (sensing resistor 13, diode 23) and back into the bottom of transformer 220. The diode 23 directs the current supplied to the EEFLs flowing to transformer 220. Therefore, this portion of the current is not detected via the first current sensing circuit 101 (sensing resistor 17) which only senses the amount of the current flowing through EEFL(1), EEFL(2)... and EEFL(n−1). The current flowing through sensing resistor 13 of second current sensing circuit 102 is equal to the total current of the current flowing through sensing resistor 17 of first current sensing circuit 101 plus the leakage current. As described with respect to FIG. 2, sensing resistor 17 senses a positive half-wave quasi-sinusoidal current while sensing resistor 13 senses a negative half-wave current. That is, the first current sensing circuit 101 senses a positive current and the second current sensing circuit 102 senses a negative current. Assume that the resistance of sensing resistor 17 is equal to that of sensing resistor 13, by summing the sensed voltage across sensing resistor 13 and sensing resistor 17 through resistor 35, 36 and capacitor 6, the sensed voltage at node V3 will be lower than 0 volt. That's because the positive current flowing through sensing resistor 17 of first current sensing circuit 101 is less than the negative current flowing through sensing resistor 13 of second current sensing circuit 102. Therefore, the sensed voltage at node V3 is lower than 0 Volt while the sensed voltage at node V2 is greater than 0 Volt compared to the normal operating condition, if the right end of one of the EEFLs is disconnected. Therefore, back to FIG. 6, If V2>0 and V3<0 or V2<0 and V3>0, then first end sensing circuit 240 will determine that the EEFL is disconnected on one end. (in step 608). First end sensing circuit 240 will further provide sensing signals to EEFL inverter controller 230 indicating that the EEFL is disconnected on one end in step 609. In step 610, EEFL inverter controller 230 will send corresponding control signals to both switching network 210 and 212. Thus the total current supplied to the EEFLs which remain connected to the transformer will be reduced in step 611. Therefore the protection means of providing protection function to the EEFL driving circuit when the EEFL is disconnected on one end is implemented.

Figure 7:
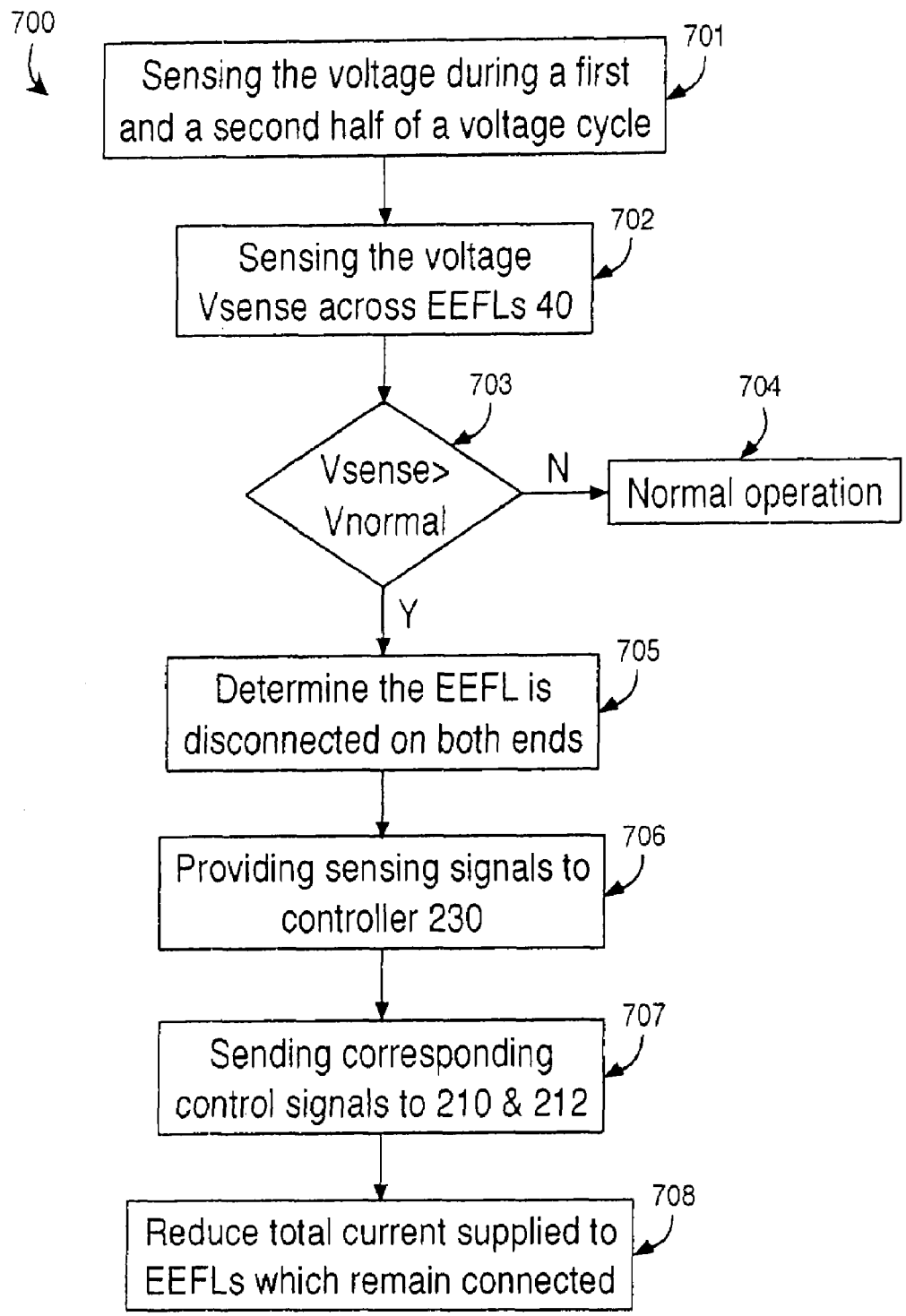
FIG. 7 is a flowing chart of a protection method provided by another end sensing circuit in accordance with the present invention when the EEFL is disconnected on both ends.

FIG. 7 is a flowing chart 700 of a protection method provided by the second end sensing circuit 250 in accordance with the present invention. Generally, first end sensing circuit 250 detects and provides protection function to a driving circuit if both ends of an EEFL are disconnected. In step 702 of FIG. 7, the second end sensing circuit 250 senses the voltage Vsense across the EEFLs 40 by sensing the voltage during a first half of a voltage cycle and a second half of a voltage cycle in step 701. The operation of sensing the voltage Vsense across the EEFLs 40 is described in FIG. 5. Now take FIG. 5 for reference, both "right end" and "left end" of EEFL (n) are disconnected from transformer 222 and transformer 220. The current will flow only through EEFL(1), EEFL(2) ... EEFL(n−1), since EEFL(n) is not conducted. The total current will be supplied to EEFL(1), EEFL(2) ... EEFL(n−1), except EEFL(n). Since the total current is fixed and EEFL(n) is not conducted, EEFL(1), EEFL(2) ... EEFL (n−1) will be overdriven. However, the second end sensing circuit 250 will have higher sensed voltage when one of the EEFLs, e.g. EEFL(n) is not conducted since all other EEFLs (EEFL(1), EEFL(2) ... EEFL(n−1)) are driven with higher current. Second end sensing circuit 250 generally includes a first voltage sensing circuit 111 and a second voltage sensing circuit 112 and a resistor divider 50 which comprises resistor 29, 30. The first voltage sensing circuit 111 includes resistor 11, 14 and diode 30; the second voltage sensing circuit 112 includes resistor 12, 16 and diode 29. Second end sensing circuit 250 senses the voltage across the EEFLs 40. Resistor divider 50 is used to minimize the effect of voltage variation to voltage sense. As shown in the FIG. 5, the first voltage sensing circuit 111 senses the voltage during one half of the voltage cycle while the second voltage sensing circuit 112 senses voltage during the other half of the voltage cycle. The voltage sensed by the second end sensing circuit 250 at node V1 is proportional to the voltage across the EEFLs 40. Thus the voltage Vsense across the EEFLs 40 is sensed by sensing the voltage during a first half of a voltage cycle and a second half of a voltage cycle. By differentiating the voltage at node V1 under normal operation and abnormal operation conditions, EEFL inverter controller 230 can provide an appropriate protection to the inverter circuit. For example, if one of the EEFLs is not conducted, the sensed voltage at node V1 will be higher than the normal operation. In normal operation, when no EEFL is disconnected, the sensed voltage at node V1 is set as a predetermined level. Once the sensed voltage at node V1 is detected that exceeds a predetermined level which is under normal operation, a disconnection will be detected. Back to FIG. 7, if in step 702 the sensed voltage Vsense across the EEFLs 40 exceeds a predetermined level Vnormal, which represents the voltage level during normal operation, second end sensing circuit 250 will determine that the EEFL is disconnected on both ends at step 705. If not, it will be determined under normal operation in step 704. In step 706, second end sensing circuit 250 will provide sensing signals to EEFL inverter controller 230 indicating that both ends of an EEFL are disconnected. In step 707, EEFL inverter controller 230 will send corresponding control signals to both switching network 210 and 212. Thus the total current supplied to the EEFLs which remain connected to the transformer is reduced in step 708. Therefore the protection means of providing protection function to the EEFL driving circuit when both ends of the EEFL are open is implemented.

Figure 8:
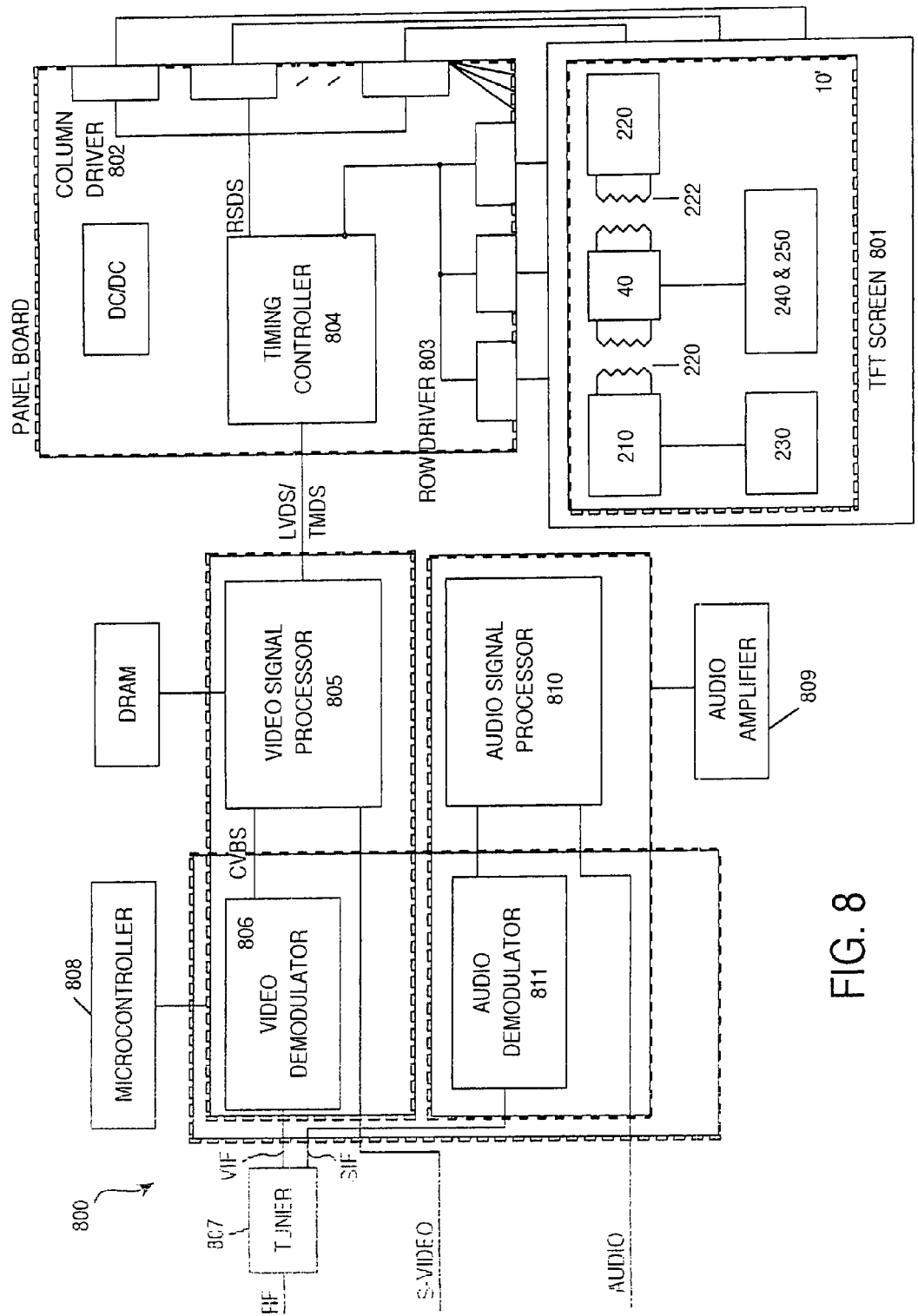
FIG. 8 is a liquid crystal display system of an embodiment of the invention.

FIG. 8 illustrates a liquid crystal display system 800 of an embodiment of the invention. Liquid crystal display system 800 comprises thin film transistor screen 801. Thin film transistor screen 801 is coupled to column driver 802. Column driver 802 controls columns on thin film transistor screen 801. Thin film transistor screen 801 is also coupled to row driver 803. Row driver 803 controls rows on thin film transistor screen 801. Column driver 802 and row driver 803 are coupled to timing controller 804. Timing controller 804 controls timing for column driver 802 and row driver 803. Timing controller 804 is coupled to video signal processor 805. Video signal processor 805 processes video signals. Video signal processor 805 is coupled to video demodulator 806. Video demodulator 806 demodulates video signals. Video demodulator 806 is coupled to tuner 807. Tuner 807 provides video signals to video demodulator 806. Tuner 807 tunes liquid crystal display system 800 to a particular frequency. Video demodulator 806 is also coupled to microcontroller 808. Tuner 807 is also coupled to audio demodulator 811. Audio demodulator 811 demodulates audio signals from tuner 807. Audio demodulator 811 is coupled to audio signal processor 810. Audio signal processor 810 processes audio signals from audio demodulator 810. Audio signal processor 810 is coupled to audio amplifier 809. Audio amplifier 809 amplifies audio signals from audio signal processor 810.

Thin film transistor screen 801 is illuminated by system 10'. As described above, system 10' includes a plurality of EEFLs 40 (EEFL(1), EEFL(2) . . . , EEFL(n)); transformer 220 and 222; switching network 210 and 212; EEFL inverter controller 230; sensing circuit 240 and 250. Once powered on, system 10' starts operation. The detailed operation of the system 10' is similar to the preferred embodiment of FIG. 2 and will not be fully described herein. Thus the EEFLs 40 are powered and will provide backlight to thin film transistor screen 801. If one or several EEFLs are disconnected, system 10' can still provide protection and avoid overdriven event.

Figure 9:
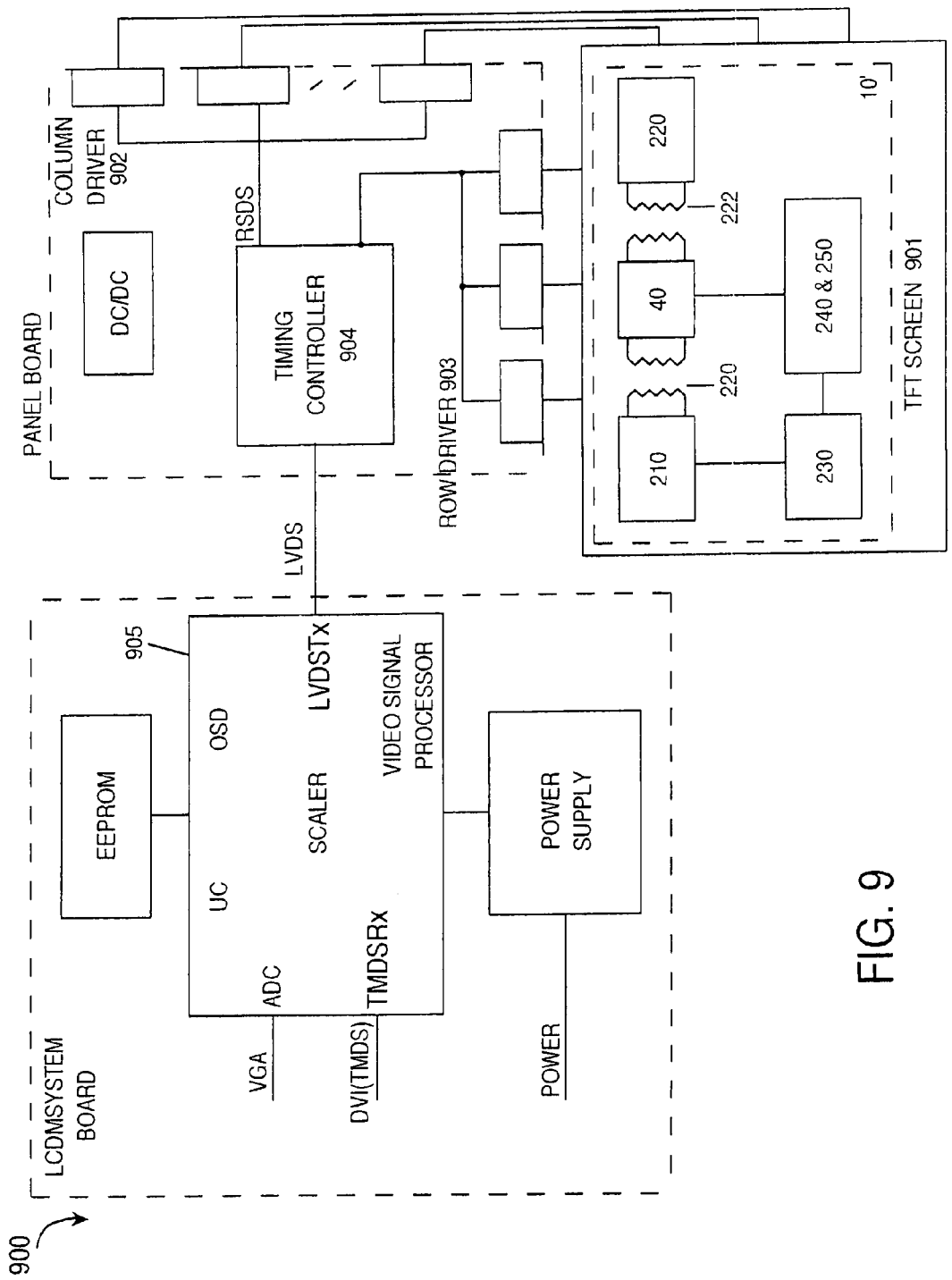
FIG. 9 is a liquid crystal display system of an embodiment of the invention.

FIG. 9 illustrates a liquid crystal display system 900 of an embodiment of the invention. Liquid crystal display system 900 comprises thin film transistor screen 901. Thin film transistor screen 901 is coupled to column driver 902. Column driver 902 controls columns on thin film transistor screen 901. Thin film transistor screen 901 is also coupled to row driver 903. Row driver 903 controls rows on thin film transistor screen 901. Column driver 902 and row driver 903 are coupled to timing controller 904. Timing controller 904 controls timing for column driver 902 and row driver 903. Timing controller 904 is coupled to video signal processor 905. Video signal processor 905 processes video signals. In an alternative embodiment, video signal processor 905 could be a scalar device.

Similarly, thin film transistor screen 901 is illuminated by system 10'. As described above, system 10' includes a plurality of EEFLs 40 (EEFL(1), EEFL(2) . . . , EEFL(n)); transformer 220 and 222; switching network 210 and 212; EEFL inverter controller 230; sensing circuit 240 and 250. Once powered on, system 10' starts operation. The detailed operation of the system 10' is similar to the preferred embodiment of FIG. 2 and will not be fully described herein. Thus the EEFLs 40 are powered and will provide backlight to thin film transistor screen 801. If one or several EEFLs are disconnected, system 10' can still provide protection and avoid overdriven event.

Figure 10:
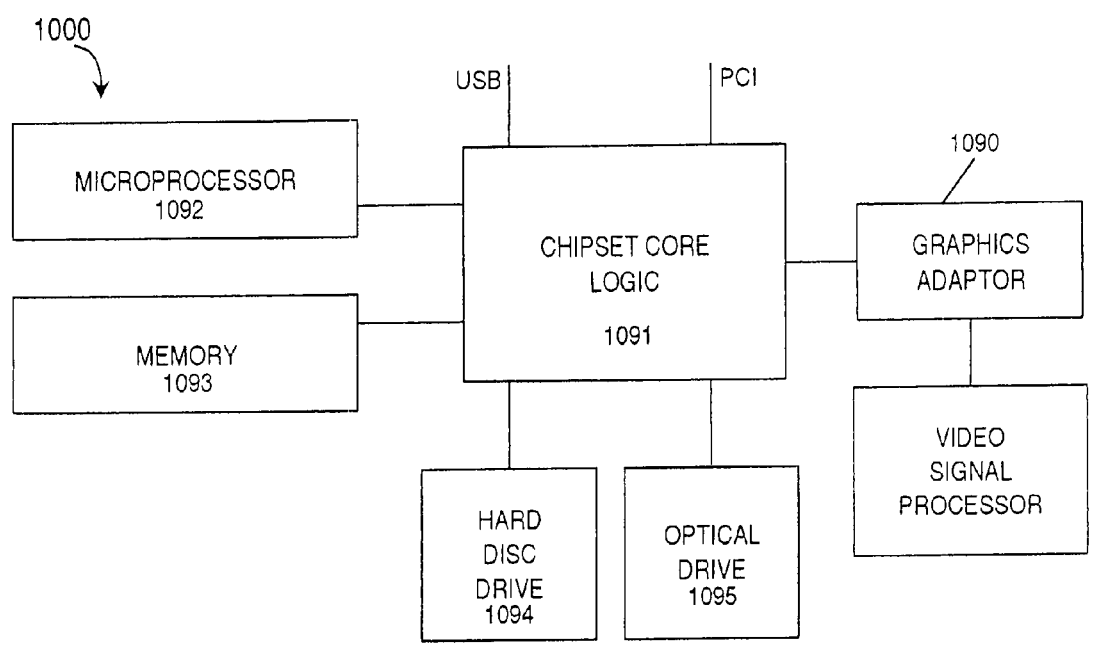
FIG. 10 is a liquid crystal display system of an embodiment of the invention.

FIG. 10 illustrates a liquid crystal display system 1000 of an embodiment of the invention. Liquid crystal display system 1000 comprises graphics adaptor 1090. Liquid crystal display system 1000 can also comprise the components of liquid crystal display system 900 described above and illustrated in FIG. 9 or can also comprise the components of liquid crystal display system 800 described above and illustrated in FIG. 8. Graphics adaptor 1090 is coupled to a video signal processor which can be video signal processor 905 described above and illustrated in FIG. 9 or video signal processor 805 described above and illustrated in FIG. 8.

Graphics adaptor 1090 is coupled to chipset core logic 1091. Chipset core logic 1091 transfers data between devices coupled to it. Chipset core logic 1091 is also coupled to microprocessor 1092. Microprocessor 1092 processes data including video data. Chipset core logic 1091 is also coupled to memory 1093. Memory 1093 can be random access memory and provides short term storage of data. Chipset core logic 1091 is also coupled to hard disk drive 1094. Hard disk drive 1094 provides long term storage of data. Chipset core logic 1091 is also coupled to optical drive 1095. Optical drive 1095 retrieves data from a CD-ROM or a DVD-ROM.

The foregoing descriptions of the preferred embodiment of the present invention are an illustration of the present invention rather than a limitation thereof. It is intended to cover various modifications and similar arrangements included within the spirit and scope of the appended claims. While the preferred embodiments of the invention has been illustrated and described, it will be appreciated that various changes can be made therein without departing from the spirit and scope of the invention.

What is claimed is:

1. An external electrode fluorescent lamp driving circuit with protection function for driving a plurality of external electrode fluorescent lamps coupled to each other in parallel, comprising:

a first transformer coupled to said plurality of external electrode fluorescent lamps;

a switching network coupled to said first transformer which delivers power to said first transformer;

a sensing circuit coupled to said plurality of external electrode fluorescent lamps which detects disconnection if one external electrode fluorescent lamp is disconnected; and a controller coupled to said switching network which controls said switching network to reduce the total current supplied to the external electrode fluorescent lamps which remain connected if said sensing circuit detects that said one external electrode fluorescent lamp is disconnected.

2. The driving circuit as claimed in claim 1, wherein said sensing circuit comprises a first voltage sensing circuit.

3. The driving circuit as claimed in claim 1, wherein said sensing circuit generates a sensing signal to said controller indicating whether said one external electrode fluorescent lamp is disconnected.

4. The driving circuit as claimed in claim 1, wherein said switching network comprises a DC/AC converter coupled to said first transformer which delivers power to said external electrode fluorescent lamps.

5. The driving circuit as claimed in claim 1 further comprising a second transformer coupled to said plurality of external electrode fluorescent lamps.

6. The driving circuit as claimed in claim 5, wherein said first transformer and said second transformer are 180 degree off phase to each other.

7. The driving circuit as claimed in claim 2, wherein said sensing circuit comprises a second voltage sensing circuit.

8. The driving circuit as claimed in claim 7, wherein said first voltage sensing circuit senses a positive voltage and said second voltage sensing circuit senses a negative voltage.

9. The driving circuit as claimed in claim 1, wherein said sensing circuit respectively senses currents flowing through two sides of said plurality of external electrode fluorescent lamps, and wherein said one external electrode fluorescent lamp is disconnected if said currents are not equal to each other.

10. The driving circuit as claimed in claim 1, wherein said sensing circuit comprises a second end sensing circuit for detecting disconnection if said one external electrode fluorescent lamp is disconnected on both ends.

11. The driving circuit as claimed in claim 10, wherein said second end sensing circuit senses the voltage across said plurality of external electrode fluorescent lamps and detects disconnection if said voltage exceeds a predetermined level.

12. The driving circuit as claimed in claim 11, wherein said predetermined level indicates the voltage level across said plurality of external electrode fluorescent lamps during normal operation.

13. The driving circuit as claimed in claim 1, wherein said sensing circuit comprises a first current sensing circuit.

14. The driving circuit as claimed in claim 13, wherein said sensing circuit comprises a second current sensing circuit.

15. The driving circuit as claimed in claim 14, wherein said first current sensing circuit senses a positive current and said second current sensing circuit senses a negative current.

16. The driving circuit as claimed in claim 14, wherein said first current sensing circuit senses current during half of a current cycle and said second current sensing circuit senses current during half of a current cycle.

17. The driving circuit as claimed in claim 13 wherein said sensing circuit comprises a third current sensing circuit and a fourth current sensing circuit.

18. The driving circuit as claimed in claim 7, wherein said first voltage sensing circuit senses voltage during half of a voltage cycle and said second voltage sensing circuit senses voltage during half of a voltage cycle.

19. An inverter controller for controlling current to a plurality of external electrode fluorescent lamps coupled to each other in parallel, comprising:

a voltage input for detecting a voltage value;

a sensing circuit coupled to said voltage input which detects disconnection if one external electrode fluorescent lamp is disconnected;

a switch output for providing signals to control a transformer switch; and control circuitry coupled to said switch output and sensing circuit which controls said switch output to reduce the total current supplied to the external electrode lamps which remain connected if said sensing circuit detects that said one external electrode fluorescent lamp is disconnected.

20. The inverter controller as claimed in claim 19, wherein said voltage input detects the voltage across said plurality of external electrode fluorescent lamps which indicates whether said one external electrode fluorescent lamp is disconnected on both ends.

21. The inverter controller as claimed in claim 19 further comprising:

a lamp current input indicating whether said one external electrode fluorescent lamp is disconnected on one end.

22. A method for protecting a plurality of external electrode fluorescent lamps coupled to each other in parallel from being overdriven, comprising:

detecting if one external electrode fluorescent lamp is disconnected;

generating a sensing signal indicating whether said one external electrode fluorescent lamp is disconnected; and reducing the total current supplied to the plurality of external electrode fluorescent lamps which remain connected if said sensing signal indicates that said one external electrode fluorescent lamp is disconnected.

23. The method as claimed in claim 22 further comprising the step of detecting disconnection if said one external electrode fluorescent lamp is disconnected on one end.

24. The method as claimed in claim 22 further comprising the step of sensing the current during a first half of a current cycle.

25. The method as claimed in claim 24 further comprising the step of sensing the current during a second half of a current cycle.

26. The method as claimed in claim 24 further comprising:

the step of generating a first voltage indicating current through a first end of a plurality of external electrode fluorescent lamps; and the step of generating a second voltage indicating current through a second end of a plurality of external electrode fluorescent lamps.

27. The method as claimed in claim 26, wherein said sum of said first voltage and said second voltage indicates the current difference between the current through said first end of said plurality of external electrode fluorescent lamps and the current through said second end of said plurality of external electrode fluorescent lamps.

28. The method as claimed in claim 22 further comprising the step of reducing said total current supplied to said external electrode fluorescent lamps which remain connected if said sum of said first voltage and said second voltage exceeds a predetermined level.

29. The method as claimed in claim 28, wherein said predetermined level comprises 0 volt which indicates the voltage level under normal operation.

30. The method as claimed in claim 22 further comprising the step of detecting disconnection if said one external electrode fluorescent lamp is disconnected on both ends.

31. The method as claimed in claim 30 further comprising the step of sensing the voltage during a first half of a voltage cycle.

32. The method as claimed in claim 31 further comprising the step of sensing the voltage during a second half of a voltage cycle.

33. The method as claimed in claim 30 further comprising the step of sensing the voltage across said plurality of external electrode fluorescent lamps.

34. The method as claimed in claim 33 further comprising the step of reducing said total current supplied to said plurality of external electrode fluorescent lamps which remain connected if said voltage exceeds a predetermined level.

35. The method as claimed in claim 34, wherein said predetermined level indicates the voltage level across said plurality of external electrode fluorescent lamps during normal operation.

* * * * *